United States Patent
Sapak et al.

(10) Patent No.: US 9,874,654 B2
(45) Date of Patent: Jan. 23, 2018

(54) MOTION DETECTOR HAVING A BANDPASS FILTER

(71) Applicant: Honeywell International Inc., Morristown, NJ (US)

(72) Inventors: Jiri Sapak, Brno (CZ); Ludek Zavodny, Kozlovice (CZ); Roman Cervinka, Brno (CZ); Jan Crha, Brno (CZ); Robert Juntunen, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/130,430

(22) Filed: Apr. 15, 2016

(65) Prior Publication Data

US 2017/0299768 A1    Oct. 19, 2017

(51) Int. Cl.
- *G01V 8/10* (2006.01)
- *G01J 1/04* (2006.01)

(52) U.S. Cl.
CPC .............. *G01V 8/10* (2013.01); *G01J 1/0488* (2013.01)

(58) Field of Classification Search
CPC ...................................................... G01V 8/10
See application file for complete search history.

(56) References Cited

U.S. PATENT DOCUMENTS

| | | | | |
|---|---|---|---|---|
| 5,127,575 A | * | 7/1992 | Beerbaum | H05B 37/0227 165/11.1 |
| 5,475,365 A | * | 12/1995 | Hoseit | G08B 29/183 340/508 |
| 6,091,355 A | * | 7/2000 | Cadotte, Jr. | G01S 7/032 342/104 |
| 6,225,748 B1 | | 5/2001 | Evans et al. | |
| 6,872,948 B2 | | 3/2005 | Lee | |
| 2014/0139643 A1 | * | 5/2014 | Hogasten | H01L 27/14609 348/48 |

OTHER PUBLICATIONS

"Pyroelectric Infrared Sensors", Murata Manufacturing Co., Ltd., http://www.murata.com/~/media/webrenewal/support/library/catalog/products/sensor/infrared/s21e.ashx, Oct. 1, 2012, 25 pp.

* cited by examiner

*Primary Examiner* — David Porta
*Assistant Examiner* — Hugh H Maupin
(74) *Attorney, Agent, or Firm* — Brooks, Cameron & Huebsch, PLLC

(57) ABSTRACT

A motion detector having a bandpass filter is described herein. One device includes a passive infrared (PIR) sensor configured to generate a signal, and a bandpass filter configured to filter the signal, wherein the bandpass filter comprises a plurality of high pass filters, a plurality of low pass filters, and two operational amplifiers, wherein a portion of the plurality of high pass filters include a capacitor and two resistors.

18 Claims, 4 Drawing Sheets

US 9,874,654 B2

MOTION DETECTOR HAVING A BANDPASS FILTER

TECHNICAL FIELD

The present disclosure relates to a motion detector having a bandpass filter.

BACKGROUND

Facilities can use a thermostat with a motion detector to detect the presence of an occupant in a facility. The presence of an occupant can cause a thermostat of the facility to be enabled, allowing for the conditioning of the facility or a space in the facility. For example, the detection of the presence of an occupant in the facility or a space in the facility by a motion detector can cause a thermostat to cause the facility or the space in the facility to be heated or cooled.

DETAILED DESCRIPTION

A motion detector having a bandpass filter is described herein. For example, one or more embodiments include a passive infrared (PIR) sensor configured to generate a signal, and a bandpass filter configured to filter the signal, wherein the bandpass filter comprises a plurality of high pass filters, a plurality of low pass filters, and two operational amplifiers, wherein a portion of the plurality of high pass filters include a capacitor and two resistors.

Motion detectors can help reduce heating and/or cooling costs of a facility. For example, a thermostat can use a passive infrared (PIR) sensor to detect the presence of an occupant and adjust the heating and/or cooling of the facility accordingly. However, PIR sensors can be sensitive to heat generated by surrounding electronic components that may be included in the thermostat housing and/or proximate to the PIR sensor.

Heat generated by surrounding electrical components can cause the PIR sensor to output signals that can include unwanted signal noise. In some instances, the signal noise can be stronger than a useful signal generated by the PIR sensor in response to the presence of an occupant.

Signal noise can cause the thermostat to be erroneously enabled. For example, the signal noise can cause the thermostat to be enabled when there is not an occupant near the PIR sensor. Enabling the thermostat in response to signal noise rather than actual occupancy can lead to unnecessary conditioning of the facility or a space in the facility, and can result in higher heating and/or cooling costs. Additionally, when the thermostat does not include a dedicated power source, enabling the thermostat in response to signal noise can expend energy stored in a battery or capacitor powering the thermostat.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

Figure 4:
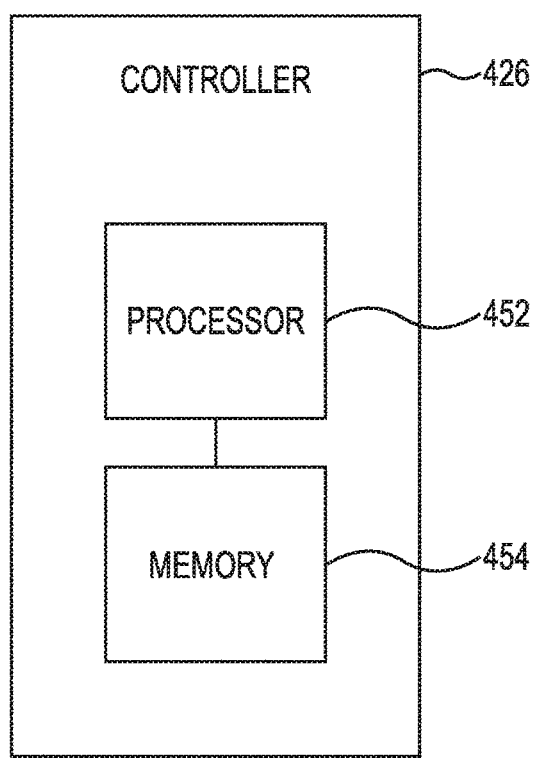
FIG. 4 is a schematic block diagram of a controller for a motion detector, in accordance with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, controller 126 as shown in FIG. 1 can be controller 426, as shown in FIG. 4.

As used herein, "a" or "a plurality of" something can refer to one or more such things. For example, "a plurality of high pass filters" can refer to one or more high pass filters.

Figure 1:
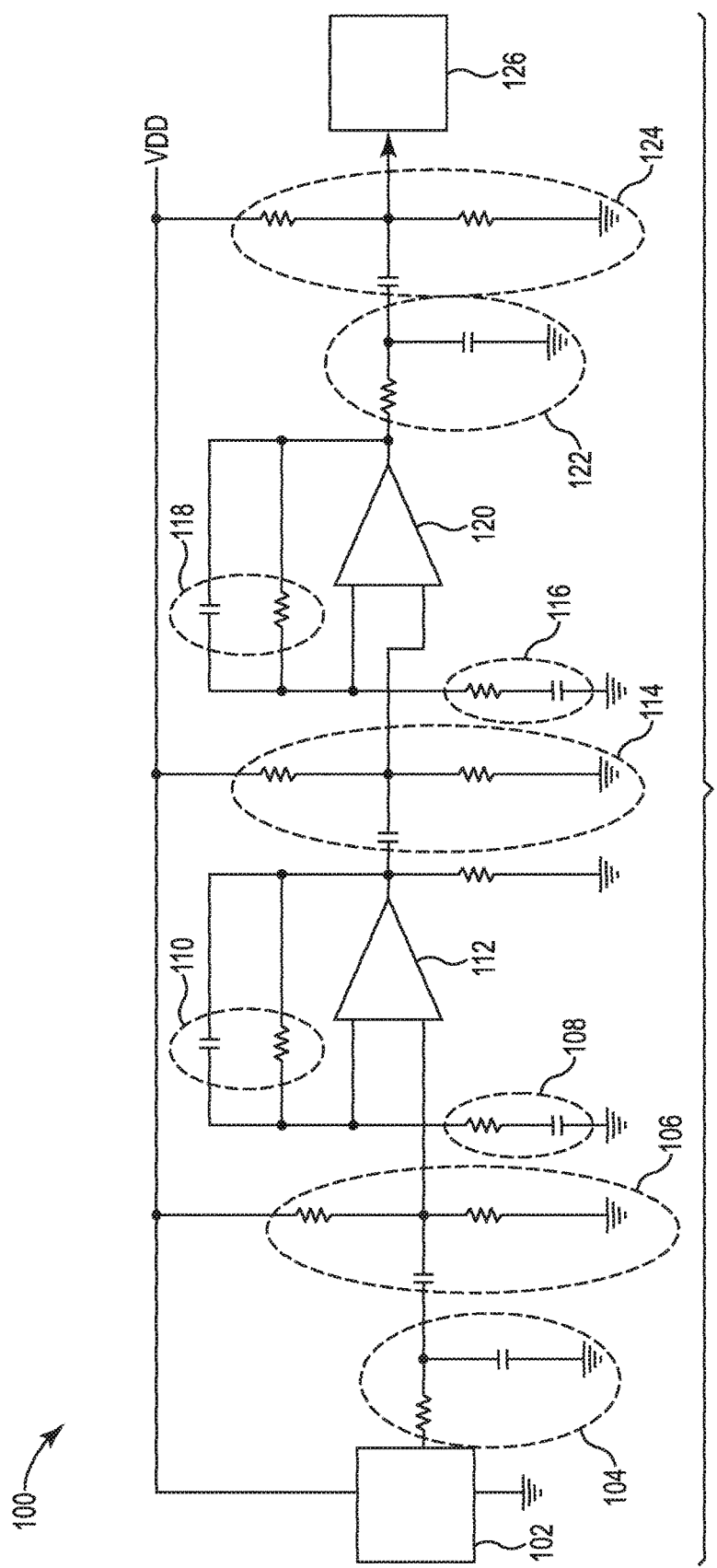
FIG. 1 illustrates an example motion detector, in accordance with one or more embodiments of the present disclosure.

FIG. 1 illustrates an example motion detector, in accordance with one or more embodiments of the present disclosure. As shown in FIG. 1, motion detector 100 can include a passive infrared (PIR) sensor 102, a bandpass filter 103, and a controller 126.

As used herein, a PIR sensor refers to a device that measures infrared light radiating from objects in its field of view. For example, an object radiating heat, such as an occupant of a facility or a space in the facility, can be detected by the PIR sensor 102 measuring the radiating heat. The PIR sensor 102 can be used to detect occupancy of a space by detecting a change in temperature of an area in front of the PIR sensor's field of view as a result of an object radiating heat in the PIR sensor's field of view.

The PIR sensor 102 can generate a signal including a frequency and a voltage. The signal can be an alternating-current (AC) signal (e.g., the signal is variable in time) which may be superimposed a specific constant direct-current (DC) voltage level. The resulting superposition can be a signal which is variable in time (e.g., AC signal) but with a positive polarity.

The signal can be generated by the PIR sensor 102 in response to the PIR sensor 102 detecting motion. For example, the PIR sensor 102 can detect a change (e.g., a rise) in temperature in the sensor's field of view as a result of an object (e.g., an occupant) moving through the sensor's field of view.

The signal voltage from the PIR sensor 102 can be 0.7 volts (V). For instance, the stable component of the signal from the PIR sensor 102 can be 0.7 V DC. For example, the signal voltage of the signal generated by the PIR sensor 102 at the output of the PIR sensor 102 can be 0.7 V, although embodiments of the present disclosure are not limited to an output signal voltage of the PIR sensor 102 of 0.7 V.

The motion detector 100 can include a bandpass filter 103. The bandpass filter 103 can include a plurality of high pass filters, a plurality of low pass filters, and two operational amplifiers. For example, in the embodiment illustrated in FIG. 1, bandpass filter 103 includes high pass filters 106, 108, 114, 116, and 124, low pass filters 104, 110, 118, and 122, and operational amplifiers 112 and 120, as will be further described herein. As used herein, a bandpass filter refers to a device that can pass and/or amplify signals with frequencies within a certain range and attenuate signals with frequencies outside of the certain range. For instance, signals with frequencies within the passing bandwidth may be amplified by operational amplifiers 112 and 120, as will be further described herein.

The bandpass filter 103 can pass the signal from the PIR sensor 102 to the controller 126 if the signal has a frequency within a range defined by an upper transition frequency and a lower transition frequency. For instance, the range defined by the controller 126 can be a frequency range which includes frequencies occurring in the case of occupancy. For example, the bandpass filter 103 can cause frequencies generated by the PIR sensor 102 that are within an upper transition frequency of 18 Hz and within a lower transition frequency of 0.04 Hz to be passed to the controller 126.

As used herein, a high pass filter refers to a device that can pass signals with frequencies higher than a certain cutoff frequency and attenuate signals with frequencies lower than the cutoff frequency. For example, a high pass filter with a cutoff frequency of 0.04 Hz can pass signals with frequencies higher than 0.04 Hz and attenuate signals with frequencies lower than 0.04 Hz.

As used herein, a low pass filter refers to a device that can pass signals with frequencies lower than a certain cutoff frequency and attenuate signals with frequencies higher than the cutoff frequency. For example, a low pass filter with a cutoff frequency of 18 Hz can pass signals with frequencies lower than 18 Hz and attenuate signals with frequencies higher than 18 Hz.

As used herein, an operational amplifier can refer to a direct current (DC) coupled electronic voltage amplifier. An operational amplifier can increase the power of a signal.

The bandpass filter 103 illustrated in FIG. 1 can include five high pass filters, wherein a portion of the five high pass filters include a capacitor and two resistors. For instance, the bandpass filter 103 can include a high pass filter 106, a high pass filter 108, a high pass filter 114, a high pass filter 116, and a high pass filter 124, where high pass filter 106, high pass filter 114, and high pass filter 124 include a capacitor and two resistors. That is, the bandpass filter 103 can include five high pass filters, where three (e.g., a portion or a subset) of the five (e.g., the plurality of) high pass filters can include a capacitor and two resistors.

The bandpass filter 103 as illustrated in FIG. 1 can include four low pass filters. For instance, the bandpass filter 103 can include a low pass filter 104, a low pass filter 110, a third low pass filter 118, and a low pass filter 122.

The bandpass filter 103 as illustrated in FIG. 1 can include two operational amplifiers. For instance, the bandpass filter 103 can include an operational amplifier 112 and an operational amplifier 120.

To achieve optimal performance of bandpass filter 103, a time constant of low pass filter 104 can be the same as the time constant of low pass filters 110, 118, and 122. For instance, the time constant of the low pass filters can be the same. Additionally, a time constant of high pass filter 106 can be the same as the time constant of high pass filters 108, 114, 116, and 124. Further, the time constant of low pass filters 104, 110, 118, and 122 can be different than the time constant of high pass filters 106, 108, 114, 116, and 124. As used herein, a time constant of a filter defines a cutoff frequency (e.g., transition frequency) of the filter.

As shown in FIG. 1, the PIR sensor 102 and the low pass filter 104 can be connected in series. For example, the PIR sensor 102 and the low pass filter 104 can be connected along a single path (e.g., the same current flows through the PIR sensor 102 and the low pass filter 104).

The high pass filter 106 can be connected in series with the low pass filter 104, as well as with a high impedance input of the operational amplifier 112. The high pass filter 106 can be connected with the low pass filter 104 along a single path. For example, the high pass filter 106 can be connected in series between the low pass filter 104 and a high impedance input of the operational amplifier 112.

The operational amplifier 112 can be connected in series with the high pass filter 106 and the high pass filter 114. The operational amplifier 112 can be connected with low pass filter 110 and with high pass filter 108 in operational amplifier 112's own feedback. The operational amplifier 112 can be connected with the high pass filter 106 along a single path. Additionally, the operational amplifier 112 can be connected with the high pass filter 114 along the single path. For instance, the operational amplifier 112 can be connected in series between the high pass filter 106 and the high pass filter 114.

The high pass filter 114 can be connected in series with the operational amplifier 112, as well as with a high impedance input of operational amplifier 120. The high pass filter 114 can be connected with the operational amplifier 112 along a single path. For example, the high pass filter 114 can be connected in series between the operational amplifier 112 and a high impedance input of the operational amplifier 120.

The operational amplifier 120 can be connected in series with the high pass filters 114 and the low pass filter 122. The operational amplifier 120 can be connected with low pass filter 118 and with high pass filter 116 in operational amplifier 120's own feedback. The operational amplifier 120 can be connected with the high pass filter 114 along a single path. Additionally, the operational amplifier 120 can be connected with the low pass filter 122 along the single path. For instance, the operational amplifier 120 can be connected in series between the high pass filter 114 and the low pass filter 122.

The low pass filter 122 can be connected in series with the operational amplifier 120 and the high pass filter 124. The low pass filter 122 can be connected with the operational amplifier 120 along a single path. Additionally, the low pass filter 122 can be connected with the high pass filter 124 along the single path. For instance, the low pass filter 122 can be connected in series in between the operational amplifier 120 and the high pass filter 124.

The motion detector 100 can include a controller 126. The controller 126 can be connected to the bandpass filter 103. The controller 126 can enable a thermostat based on a signal from the PIR sensor 102, as will be further described herein.

The signal voltage from PIR sensor 102 can be filtered by bandpass filter 103. For example, the bandpass filter 103 can filter the signal from the PIR sensor 102.

The DC level of the signal voltage from the PIR sensor 102 can be shifted (e.g., increased) by a voltage divider circuit formed by the high pass filter 106. For example, the high pass filter 106 can increase the DC level of the signal voltage from the PIR sensor 102. The high pass filter 106 can include two resistors and a capacitor connected to form a voltage divider circuit. For example, the signal voltage from the output of the PIR sensor 102 can be 0.7 V; the high pass filter 106 can increase the voltage to 1.55 V. As used herein, a resistor refers to an electrical component that implements electrical resistance as a circuit element. As used herein, a capacitor refers to an electrical component that stores electrical energy.

Shifting the DC level of the signal voltage from the PIR sensor 102 output from 0.7 V to VDD/2, for instance, 1.55 V, can increase (e.g., maximize) the dynamic range of the bandpass filter 103. For example, the output voltage (e.g., the steady output voltage) of the PIR sensor 102 of 0.7 V can be attenuated by a capacitor of high pass filter 106. The output voltage can be restored at the output of high pass filter 106 as a result of the two resistors in high pass filter 106, where the restored DC level is shifted to VDD/2 (e.g., 1.55 V). Shifting the DC level to 1.55 V can maximize the possible voltage swing of a variable signal. The signal swinging about VDD/2 (e.g., 1.55 V) can maximize the dynamic range of the bandpass filter.

The high pass filters 114 and 124 can additionally cancel VDD/2 DC voltage level at the high pass filters' respective inputs, and correspondingly restore the DC voltage level to VDD/2 at the high pass filters' respective outputs. The low pass filters 108 and 116 do not affect the DC voltage level passing through operational amplifiers 112 and 120, respectively.

The signal from the PIR sensor 102 can be amplified by the two operational amplifiers. For example, the operational amplifiers 112 and 120 can increase the power of the signal from the PIR sensor 102.

The PIR sensor 102 can have a detection range for motion of 0.2 Hz to 2.5 Hz. For instance, the PIR sensor 102 can detect occupancy based on a detection range of 0.2 Hz to 2.5 Hz.

Although the range of motion detection of the PIR sensor 102 is described as being 0.2 Hz to 2.5 Hz, the operational range of the PIR sensor 102 can be larger than the range for detecting motion. For example, the operational range of the PIR sensor 102 can be 0.04 Hz to 18 Hz. The larger operational range of the PIR sensor 102 can allow for the possibility of unwanted signal noise from heat generated by electrical components proximate to the PIR sensor 102 erroneously being determined to be motion of an occupant of a facility or a space in the facility. For example, heat can cause signal noise as being interpreted as motion and erroneously enabling a thermostat.

By filtering the signal from PIR sensor 102, the bandpass filter 103 can filter the signal noise caused by heat generated by electrical components proximate to the PIR sensor 102 to prevent erroneously enabling a thermostat. The signal from PIR sensor 102 can be filtered by the five high pass filters, four low pass filters, and two operational amplifiers of the bandpass filter 103.

The controller 126 can enable a thermostat in response to the signal voltage from the PIR sensor 102 of the filtered signal being outside of a voltage range. For example, a voltage range can be defined by the controller 126. The upper threshold voltage can be can be defined by the controller 126, and the lower threshold voltage can be defined by the controller 126, as will be further described in connection with FIG. 3.

The signal voltage being outside of the voltage range can cause the controller 126 to enable a thermostat. For example, the PIR sensor 102 can generate a signal based on a detected temperature change relating to an occupancy of a facility of a space in a facility. The generated signal can be filtered by the bandpass filter 103, and the resulting signal voltage can be outside of the voltage range. The controller 126 can, in response to the signal voltage being outside of the voltage range, enable the thermostat.

In some examples, the PIR sensor 102 can generate a signal based on detection of heat generated by electrical components proximate to the PIR sensor 102. The generated signal can be filtered by the bandpass filter 103, and the resulting signal voltage (e.g., signal noise) can within the voltage range. For instance, the bandpass filter 103 can filter the signal noise generated by heat generation that is not due to occupancy of a facility or a space in the facility. The controller 126 can, in response to the signal voltage being inside of the voltage range, refrain from enabling the thermostat, as will be further described in connection with FIG. 3.

A motion detector with a bandpass filter including a plurality of high pass filters comprising a capacitor and two resistors, in accordance with the present disclosure, can allow for enabling thermostats based on motion of an occupant of a facility or a space in the facility and reduce instances where thermostats may be enabled based on signal noise created by heat generated from electrical components that may be proximate to the PIR sensor. Further, using the plurality of high pass filters and the plurality of low pass filters while using two operational amplifiers can reduce component costs, while effectively filtering signal noise generated by heat and passing useful signals generated by occupancy.

Using a plurality of high pass filters can allow for a steeper boundary (e.g., low frequency limit) of a bandpass filter. That is, utilizing a higher number of high pass filters can increase the steepness of the low frequency limit of a bandpass filter. Additionally, using a plurality of low pass filters can allow for a steeper boundary (e.g., high frequency limit) of the bandpass filter. That is, utilizing a higher number of low pass filters can increase the steepness of the high frequency limit of the bandpass filter. Accordingly, the higher number of high and low pass filters results in a better the differentiation between a desired signal and signal noise.

Figure 2:
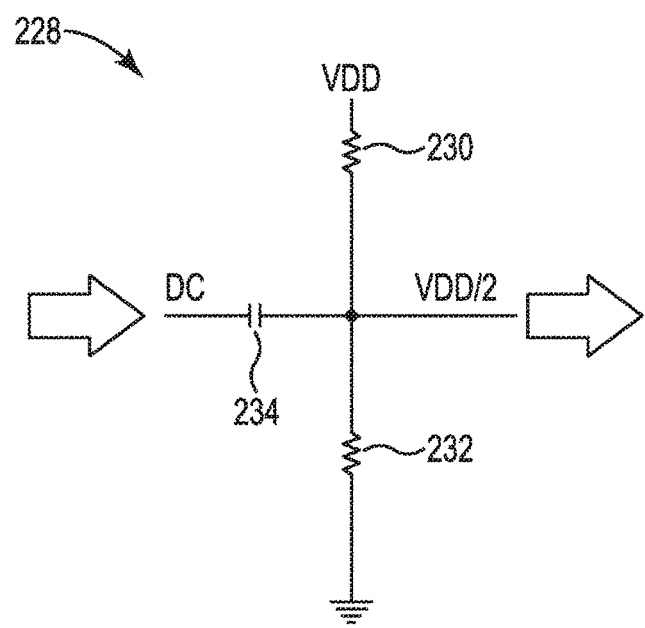
FIG. 2 illustrates an example of a high pass filter, in accordance with one or more embodiments of the present disclosure.

FIG. 2 illustrates an example of a high pass filter, in accordance with one or more embodiments of the present disclosure. The high pass filter 228 can include a first resistor 230, a second resistor 232, and a capacitor 234. The high pass filter 228 can be high pass filter 106, 114, or 124, previously described in connection with FIG. 1.

A portion of the plurality of high pass filters of a bandpass filter (e.g., bandpass filter 103, previously described in connection with FIG. 1) can include a capacitor and two resistors. For example, a bandpass filter can include five high pass filters, where three of the high pass filters include a capacitor and two resistors.

As used herein, a resistor refers to an electrical component that implements electrical resistance as a circuit element. As used herein, a capacitor refers to an electrical component that stores electrical energy.

The capacitor 234, and the first resistor 230, and the second resistor 232 of the high pass filter 228 can be connected to form a voltage divider circuit. As used herein, a voltage divider circuit refers to a circuit that produces an output voltage that is a fraction of its input voltage.

Using a high pass filter with a capacitor and two resistors connected to form a voltage divider circuit can allow for high pass filters to be connected in series with operational amplifiers. Connecting the high pass filters with a capacitor and two resistors can allow for the canceling of the DC voltage level (e.g., as previously described in connection with FIG. 1). Utilizing the high pass filters with a capacitor and two resistors can allow for the use of a higher number of high pass filters while still utilizing only two operational amplifiers. For instance, high pass filters utilizing only a capacitor and one resistor can have a wider pass band, and can lead to unwanted signal noise generated by heat from surrounding electronics being amplified to a level much larger than the useful signal generated as a result of occupancy. Hence, a high pass filter with a capacitor and two resistors connected to form a voltage divider circuit can allow for a narrower pass band, avoiding amplifying unwanted signal noise and amplifying useful signals higher relative to a high pass filter utilizing only a capacitor and one resistor.

Figure 3:
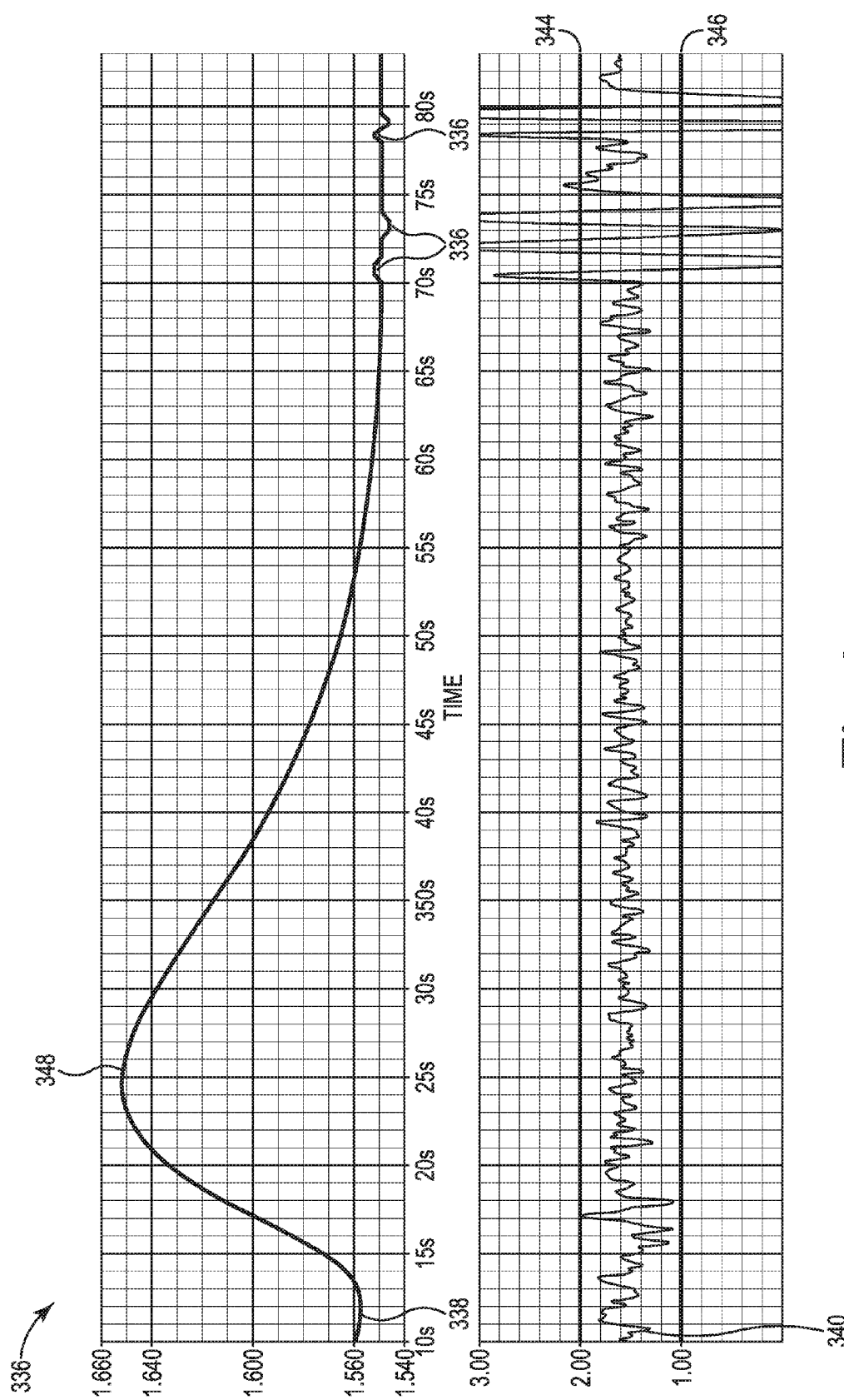
FIG. 3 illustrates an example of a time domain response of a bandpass filter, in accordance with one or more embodiments of the present disclosure.

FIG. 3 illustrates an example of a time domain response of a bandpass filter, in accordance with one or more embodiments of the present disclosure. As shown in FIG. 3, the time domain response of a bandpass filter 336 can include a PIR sensor output signal voltage 338, a filtered PIR sensor signal voltage 340, an upper threshold voltage 344, a lower threshold voltage 346, a signal generated from heat 348, and a signal generated from occupancy 350.

A controller (e.g., controller 126, previously described in connection with FIG. 1) can define the upper threshold voltage 344. For example, as shown in FIG. 3, the controller can determine the upper threshold voltage 344 to be 2 V, although embodiments of the present disclosure are not limited to an upper threshold voltage 344 of 2 V.

A controller (e.g., controller 126, previously described in connection with FIG. 1) can define the lower threshold voltage 346. For example, as shown in FIG. 3, the controller can determine the lower threshold voltage 346 to be 1 V, although embodiments of the present disclosure are not limited to a lower threshold voltage 346 of 1 V.

A controller (e.g., controller 126, previously described in connection with FIG. 1) can refrain from enabling the thermostat if the voltage of the signal is within the upper threshold voltage 344 and the lower threshold voltage 346. For example, the signal generated from heat 348 can be a signal generated by the PIR sensor. The output signal voltage can be within the upper threshold voltage 344 and the lower threshold voltage 346, and in response the controller can refrain from enabling the thermostat.

The controller can enable a thermostat based on a voltage of the signal from the PIR sensor being higher than an upper threshold voltage 344. For example, a signal generated from occupancy 336 can be generated by the PIR sensor as a PIR sensor output signal voltage 338 in response to an occupant being in a facility or a space in the facility. The PIR sensor output signal voltage 338 can be filtered by a bandpass filter (e.g., bandpass filter 103, previously described in connection with FIG. 1), and be represented by a PIR sensor filtered output signal voltage 340. As shown in FIG. 3, the PIR sensor filtered output signal voltage 340 is higher than the upper threshold voltage 344. In response to the PIR sensor filtered output signal voltage 340 being higher than the upper threshold voltage 344, the controller can enable the thermostat.

The controller can enable a thermostat based on a voltage of the signal from the PIR sensor being less than a lower threshold voltage 346. For example, a signal generated from occupancy 350 can be generated by the PIR sensor as a PIR sensor output signal voltage 338 in response to an occupant being in a facility or a space in the facility. The PIR sensor output signal voltage 338 can be filtered by a bandpass filter (e.g., bandpass filter 103, previously described in connection with FIG. 1), and be represented by a PIR sensor filtered output signal voltage 340. As shown in FIG. 3, the PIR sensor filtered output signal voltage 340 is lower than the lower threshold voltage 346. In response to the PIR sensor filtered output signal voltage 340 being lower than the lower threshold voltage 346, the controller can enable the thermostat.

FIG. 4 is a schematic block diagram of a controller for a motion detector, in accordance with one or more embodiments of the present disclosure. Controller 426 can be, for example, controller 126, previously described in connection with FIG. 1.

Controller 426 can include a memory 454 and a processor 452 configured for a motion detection device of a thermostat, in accordance with the present disclosure. The memory 454 can be any type of storage medium that can be accessed by the processor 452 to perform various examples of the present disclosure. For example, the memory 454 can be a non-transitory computer readable medium having computer readable instructions (e.g., computer program instructions) stored thereon that are executable by the processor 452 to enable a thermostat in response to a signal voltage of a filtered signal being outside of a voltage range.

The memory 454 can be volatile or nonvolatile memory. The memory 454 can also be removable (e.g., portable) memory, or non-removable (e.g., internal) memory. For example, the memory 454 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 454 is illustrated as being located within controller 426, respectively, embodiments of the present disclosure are not so limited. For example, memory 454 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A motion detector, comprising:
   a passive infrared (PIR) sensor configured to generate a signal; and
   a bandpass filter configured to filter the signal, wherein the bandpass filter comprises a plurality of high pass filters having a same first time constant, a plurality of low pass filters having a same second time constant that is different from the first time constant, and two operational amplifiers;
   wherein at least one of the plurality of high pass filters is a voltage divider consisting of one capacitor and two resistors, the voltage divider configured to shift a direct-current (DC) voltage level of the signal.

2. The motion detector of claim 1, wherein the motion detector includes a controller configured to enable a thermostat based on the signal from the PIR sensor.

3. The motion detector of claim 2, wherein the controller is configured to enable the thermostat based on a voltage of the signal from the PIR sensor being higher than an upper threshold voltage.

4. The motion detector of claim 2, wherein the controller is configured to enable the thermostat based on a voltage of the signal from the PIR sensor being lower than a lower threshold voltage.

5. The motion detector of claim 2, wherein the bandpass filter is configured to pass the signal from the PIR sensor to the controller if the signal has a frequency within a range defined by an upper transition frequency and a lower transition frequency.

6. The motion detector of claim 2, wherein:
   the controller defines an upper threshold voltage; and
   the controller defines a lower threshold voltage;
   wherein the controller is configured to refrain from enabling the thermostat if a voltage of the signal is within the upper threshold voltage and the lower threshold voltage.

7. The motion detector of claim 1, wherein the bandpass filter includes five high pass filters.

8. The motion detector of claim 1, wherein the bandpass filter includes four low pass filters.

9. A method for operating a motion detector, comprising:
   generating, by a passive infrared (PIR) sensor, a signal having a frequency and a voltage;
   filtering the signal by a bandpass filter, the bandpass filter including two operational amplifiers, a plurality of high pass filters having a same first time constant, and a plurality of low pass filters having a same second time constant that is different from the first time constant, wherein at least one of the plurality of high pass filters is a voltage divider consisting of one capacitor and two resistors;
   shifting, by the voltage divider, a direct-current (DC) voltage level of the signal; and
   enabling, by a controller, a thermostat in response to the voltage of the filtered signal being outside of a voltage range.

10. The method of claim 9, wherein the signal is generated by the PIR sensor in response to the PIR sensor detecting motion.

11. The method of claim 9, wherein the method includes amplifying the signal by the two operational amplifiers.

12. A motion detector, comprising:
   a passive infrared (PIR) sensor configured to generate a signal; and
   a bandpass filter configured to filter the signal, wherein the bandpass filter comprises:
      five high pass filters having a same first time constant, wherein three of the five high pass filters are voltage dividers, each respective voltage divider consisting of one a capacitor and two resistors and configured to shift a direct-current (DC) voltage level of the signal;
      four low pass filters having a same second time constant that is different from the first time constant, wherein each of the four low pass filters include a capacitor and a resistor; and
      two operational amplifiers.

13. The motion detector of claim 12, wherein the PIR sensor is connected in series with a first one of the low pass filters.

14. The motion detector of claim 13, wherein a first one of the high pass filters is connected in series with the first one of the low pass filters.

15. The motion detector of claim 12, wherein a first one of the operational amplifiers is connected in series with a first one of the high pass filters and a third one of the high pass filters.

16. The motion detector of claim 15, wherein the third one of the high pass filters is connected in series with the first one of the operational amplifiers.

17. The motion detector of claim 12, wherein a second one of the operational amplifiers is connected in series with a third one of the high pass filters and a fourth one of the low pass filters.

18. The motion detector of claim 17, wherein the fourth one of the low pass filters is connected in series with the second one of the operational amplifiers and a fifth one of the high pass filters.

* * * * *